US012505926B2

(12) United States Patent
Kim et al.

(10) Patent No.: US 12,505,926 B2
(45) Date of Patent: Dec. 23, 2025

(54) APPARATUS FOR LEARNING CEREBROVASCULAR DISEASE, APPARATUS FOR DETECTING CEREBROVASCULAR DISEASE, MEHTOD OF LEARNING CEREBROVASCULAR DISEASE AND METHOD OF DETECTING CEREBROVASCULAR DISEASE

(71) Applicant: JLK INC., Cheongju-si (KR)

(72) Inventors: Won Tae Kim, Suwon-si (KR); Shin Uk Kang, Seoul (KR); Myung Jae Lee, Seoul (KR); Dong Min Kim, Seoul (KR); Jin Seong Jang, Seoul (KR)

(73) Assignee: JLK INC., Cheongju-si (KR)

(*) Notice: Subject to any disclaimer, the term of this patent is extended or adjusted under 35 U.S.C. 154(b) by 1214 days.

(21) Appl. No.: 17/418,914

(22) PCT Filed: Dec. 27, 2019

(86) PCT No.: PCT/KR2019/018586
§ 371 (c)(1),
(2) Date: Jun. 28, 2021

(87) PCT Pub. No.: WO2020/139009
PCT Pub. Date: Jul. 2, 2020

(65) Prior Publication Data
US 2022/0122729 A1   Apr. 21, 2022

(30) Foreign Application Priority Data
Dec. 27, 2018  (KR) .................. 10-2018-0171151

(51) Int. Cl.
*G16H 50/20*  (2018.01)
*G06N 3/02*  (2006.01)
(Continued)

(52) U.S. Cl.
CPC ............... *G16H 50/20* (2018.01); *G06N 3/02* (2013.01); *G06T 7/0012* (2013.01); *G06T 2207/20084* (2013.01); *G06T 2207/30096* (2013.01)

(58) Field of Classification Search
CPC ........ G16H 50/20; G16H 30/40; G16H 50/70; G06N 3/02; G06N 3/045; G06N 3/08; (Continued)

(56) References Cited

U.S. PATENT DOCUMENTS 5,652,871 A * 7/1997 Steinman ............. G06F 30/20
700/90
2013/0335083 A1* 12/2013 Wasserman ........ G01R 33/5635
324/309

(Continued)

FOREIGN PATENT DOCUMENTS

KR        10-1754291 B1    7/2017
KR    10-2018-0021635 A    3/2018
(Continued)

OTHER PUBLICATIONS

Jeong-Gyu, Shin, Deep Learning and data, KAKAO AI Report, Oct. 2017, vol. 7, pp. 22-27.

*Primary Examiner* — Siamak Harandi
(74) *Attorney, Agent, or Firm* — BROADVIEW IP LAW, PC

(57) ABSTRACT

A cerebrovascular disease learning apparatus may be provided. The cerebrovascular disease learning apparatus may include a maximum intensity projection magnetic resonance angiography (MIP MRA) configuration unit configured to receive 3D time-of-flight magnetic resonance angiography (3D TOF MRA) and to construct MIP MRA including a plurality of image frames, a space characteristic learning unit configured to construct a space characteristic learning model, a frame characteristic learning unit configured to (Continued)

receive the space characteristics and to construct a frame characteristic learning model based on a recurrent neural network (RNN) learning method, and a lesion characteristic learning unit configured to receive the frame characteristics and to construct a lesion characteristic learning model based on the CNN learning method.

9 Claims, 12 Drawing Sheets

(51) Int. Cl.
    *G06N 3/045*     (2023.01)
    *G06T 7/00*     (2017.01)

(58) Field of Classification Search
    CPC ......... G06T 7/0012; G06T 2207/20084; G06T 2207/30096
    See application file for complete search history.

(56) References Cited

U.S. PATENT DOCUMENTS

| | | |
|---|---|---|
| 2018/0259608 A1 | 9/2018 | Golden et al. |
| 2019/0353741 A1* | 11/2019 | Bolster, Jr. ............. G06V 40/15 |
| 2019/0365342 A1* | 12/2019 | Ghaffarzadegan ....... A61B 7/04 |
| 2020/0285890 A1* | 9/2020 | Fuchs ................... G06F 18/214 |

FOREIGN PATENT DOCUMENTS

| | | | |
|---|---|---|---|
| KR | 2018-0021635 A | * | 3/2018 |
| KR | 10-1884609 B1 | | 8/2018 |
| KR | 10-2021515 B1 | | 9/2019 |

* cited by examiner

APPARATUS FOR LEARNING CEREBROVASCULAR DISEASE, APPARATUS FOR DETECTING CEREBROVASCULAR DISEASE, MEHTOD OF LEARNING CEREBROVASCULAR DISEASE AND METHOD OF DETECTING CEREBROVASCULAR DISEASE

TECHNICAL FIELD

The present disclosure relates to deep learning model learning technology, and, more particularly, to a method and apparatus for learning/detecting a cerebrovascular disease using an image obtained by photographing a body area based on image information analysis.

BACKGROUND ART

Deep learning learns a very large amount of data and selects an answer with a highest probability based on a result of learning when new data is input. Since such deep learning may adaptively operate according to an image and automatically find characteristic factors in a process of learning a model based on data, attempts to utilize deep learning in the field of artificial intelligence are increasing recently.

On the other hand, in conventional image analysis technology using deep learning in relation to image recognition, local features for each area of an image are extracted using a convolutional neural network (CNN) and a max pooling technique, thereby recognizing an image. However, this method may not provide an accurate recognition result with respect to an image, actual content of which is different, but, local information form of which is similar.

TECHNICAL PROBLEM

On the other hand, since it is necessary to consider both a vast amount of image data and clinical information of patients for diagnosis and prognosis of a cerebrovascular disease, it may take considerable time for diagnosis and a diagnosis result may significantly vary depending on the skill level of a medical team.

In particular, two-dimensional (2D) or three-dimensional (3D) magnetic resonance angiography (MRA) is widely used to confirm diagnosis and prognosis of a cerebrovascular disease. However, a user (e.g., a doctor or an image reader) needs to perform many manipulations such as change, enlargement or reduction of a projection position of an image displayed to analyze MRA.

As such, since diagnosis or prognosis of the cerebrovascular disease is made based on the manipulation of the user (e.g., the doctor or the image reader), it may take considerable time for diagnosis and a diagnosis result may significantly vary depending on the skill level of a medical team.

An object of the present disclosure is to provide a method and apparatus capable of minimizing manipulations of a user (e.g., a doctor or an image reader) and rapidly and accurately detecting an area in which diagnosis or prognosis of a cerebrovascular disease is required or an area in which a cerebrovascular disease has occurred.

Another object of the present disclosure is to provide a learning method and apparatus for rapidly and accurately detecting an area in which diagnosis of a cerebrovascular disease is required and an area in which a cerebrovascular disease has occurred.

Another object of the present disclosure is to provide a method and apparatus capable of accurately learning an area in which diagnosis of a cerebrovascular disease is required or an area in which a cerebrovascular disease has occurred, using MRA.

Another object of the present disclosure is to provide a method and apparatus capable of accurately detecting an area in which diagnosis of a cerebrovascular disease is required or an area in which a cerebrovascular disease has occurred, by only input of MRA.

The technical problems solved by the present disclosure are not limited to the above technical problems and other technical problems which are not described herein will become apparent to those skilled in the art from the following description.

TECHNICAL SOLUTION

According to an aspect of the present disclosure, a cerebrovascular disease learning apparatus may be provided. The apparatus may include a maximum intensity projection magnetic resonance angiography (MIP MRA) configuration unit configured to receive 3D time-of-flight magnetic resonance angiography (3D TOF MRA) and to construct MIP MRA including a plurality of image frames, a space characteristic learning unit configured to construct a space characteristic learning model based on a convolutional neural network (CNN) learning method, the space characteristic learning model learning space characteristics of each of the plurality of image frames, a frame characteristic learning unit configured to receive the space characteristics and to construct a frame characteristic learning model based on a recurrent neural network (RNN) learning method, the frame characteristic learning model learning frame characteristics representing characteristics between the plurality of image frames, and a lesion characteristic learning unit configured to receive the frame characteristics and to construct a lesion characteristic learning model based on the CNN learning method, the lesion characteristic learning model learning lesion characteristics of each of the plurality of image frames.

According to another aspect of the present disclosure, a cerebrovascular disease detection apparatus may be provided. The apparatus may include a maximum intensity projection magnetic resonance angiography (MIP MRA) configuration unit configured to receive 3D time-of-flight magnetic resonance angiography (3D TOF MRA) and to construct MIP MRA including a plurality of image frames, a space characteristic detector including a space characteristic learning model constructed through learning of space characteristics of each of the plurality of image frames based on a convolutional neural network (CNN) learning method and configured to detect the space characteristics of each of the plurality of image frames through the space characteristic learning model, a frame characteristic detector including a frame characteristic learning model constructed through learning of frame characteristics corresponding to the space characteristics based on a recurrent neural network (RNN) learning method and configured to detect the frame characteristics through the frame characteristic learning model, and a lesion characteristic detector including a lesion characteristic learning model constructed through learning of lesion characteristics corresponding to the frame characteristics based on the CNN learning method and configured to detect lesion characteristics of each of the plurality of image frames through the lesion characteristic learning model.

According to another aspect of the present disclosure, a cerebrovascular disease learning method may be provided.

The method may include receiving 3D time-of-flight magnetic resonance angiography (3D TOF MRA) and constructing maximum intensity projection magnetic resonance angiography (MIP MRA) including a plurality of image frames, constructing a space characteristic learning model based on a convolutional neural network (CNN) learning method, the space characteristic learning model learning space characteristics of each of the plurality of image frames, receiving the space characteristics and constructing a frame characteristic learning model based on a recurrent neural network (RNN) learning method, the frame characteristic learning model learning frame characteristics representing characteristics between the plurality of image frames, and receiving the frame characteristics and constructing a lesion characteristic learning model based on the CNN learning method, the lesion characteristic learning model learning lesion characteristics of each of the plurality of image frames.

According to another aspect of the present disclosure, a cerebrovascular disease detection method may be provided. The method may include receiving 3D time-of-flight magnetic resonance angiography (3D TOF MRA) and constructing maximum intensity projection magnetic resonance angiography (MIP MRA) including a plurality of image frames, detecting space characteristics of each of the plurality of image frames through a space characteristic learning model, the space characteristic learning mode being constructed through learning of space characteristics of each of the plurality of image frames based on a convolutional neural network (CNN) learning method, detecting frame characteristics through a frame characteristic learning model, the frame characteristic learning model being constructed through learning of frame characteristics corresponding to the space characteristics based on a recurrent neural network (RNN) learning method, and detecting lesion characteristics of each of the plurality of image frames through a lesion characteristic learning model, the lesion characteristic learning model being constructed through learning of lesion characteristics corresponding to the frame characteristics based on the CNN learning method.

The features briefly summarized above with respect to the present disclosure are merely exemplary aspects of the detailed description below of the present disclosure, and do not limit the scope of the present disclosure.

EFFECTS OF INVENTION

According to the present disclosure, it is possible to provide a method and apparatus capable of minimizing manipulations of a user (e.g., a doctor or an image reader) and rapidly and accurately detecting an area in which diagnosis or prognosis of a cerebrovascular disease is required or an area in which a cerebrovascular disease has occurred.

According to the present disclosure, it is possible to provide a method and apparatus for rapidly and accurately learning an area in which diagnosis of a cerebrovascular disease is required and an area in which a cerebrovascular disease has occurred.

According to the present disclosure, it is possible to provide a method and apparatus capable of accurately learning an area in which diagnosis of a cerebrovascular disease is required or an area in which a cerebrovascular disease has occurred, using MRA.

According to the present disclosure, it is possible to provide a method and apparatus capable of accurately detecting an area in which diagnosis of a cerebrovascular disease is required or an area in which a cerebrovascular disease has occurred, by only input of MRA.

DESCRIPTION OF DRAWINGS

The above and other objects, features and other advantages of the present disclosure will be more clearly understood from the following detailed description taken in conjunction with the accompanying drawings, in which.

MODE FOR INVENTION

Figure 1:
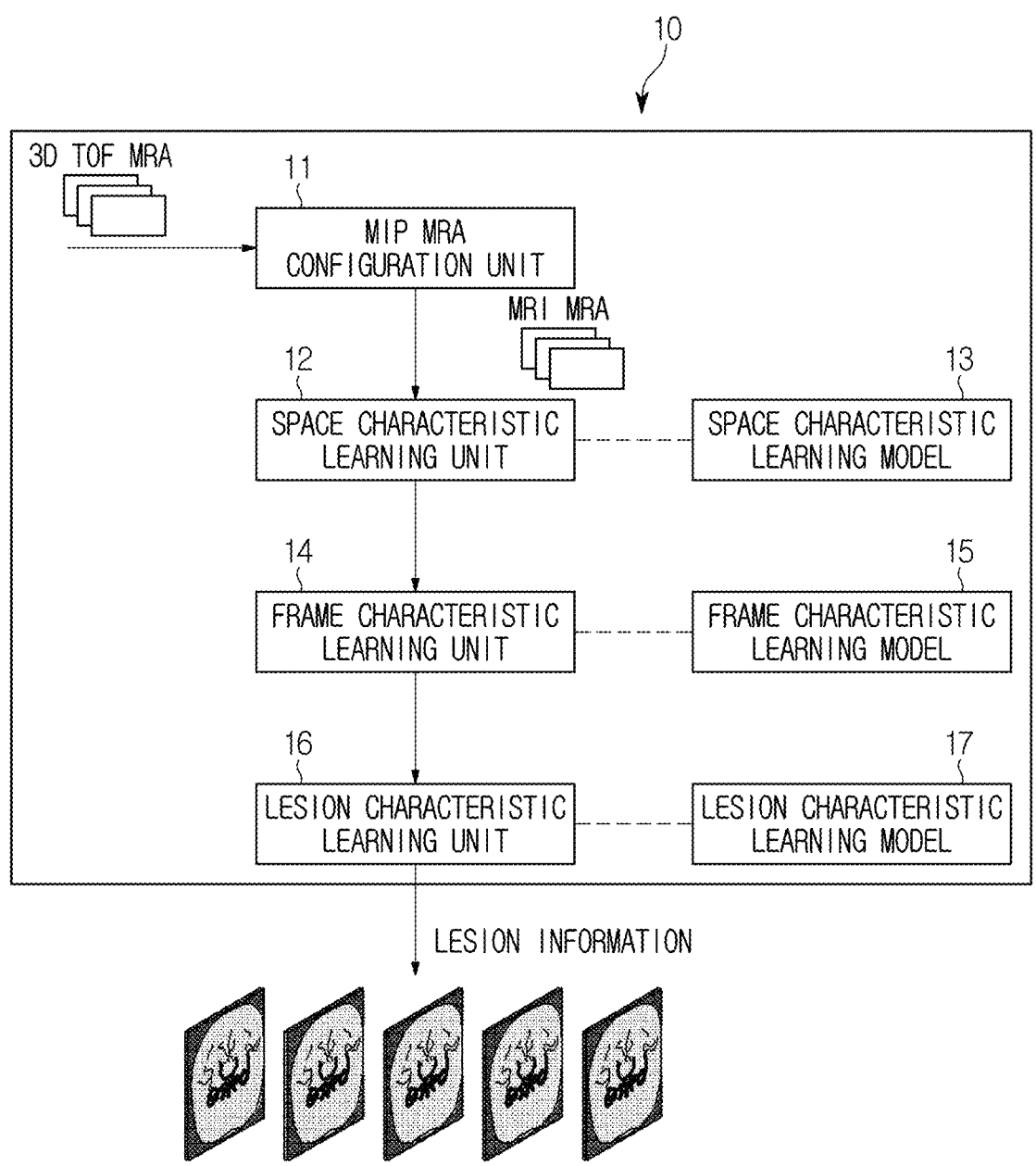
FIG. 1 is a block diagram illustrating the configuration of a cerebrovascular disease learning apparatus according to an embodiment of the present disclosure.

Hereinafter, exemplary embodiments of the present disclosure will be described in detail with reference to the accompanying drawings so that those skilled in the art can easily implement the present disclosure. However, the present disclosure may be implemented in various different forms and is not limited to the exemplary embodiments described herein.

In describing the exemplary embodiment of the present disclosure, when it is determined that a detailed description of a known configuration or function may obscure the subject matter of the present disclosure, the detailed description thereof will be omitted. In addition, parts not related to the description of the present disclosure in the drawings are omitted, and similar reference numerals are used to similar parts.

In the present disclosure, when a component is said to be "connected", "coupled", or "linked" with another component, this may include not only a direct connection, but also an indirect connection in which another component exists in the middle therebetween. In addition, when a component "includes" or "has" other components, it means that other components may be further included rather than excluding other components unless the context clearly indicates otherwise.

In the present disclosure, terms such as first and second are used only for the purpose of distinguishing one component from other components, and do not limit the order, importance, or the like of components unless otherwise noted. Accordingly, within the scope of the present disclosure, a first component in one exemplary embodiment may be referred to as a second component in another exemplary embodiment, and similarly, a second component in one exemplary embodiment may also be referred to as a first component in another exemplary embodiment.

In the present disclosure, components that are distinguished from each other are intended to clearly describe each of their characteristics, and do not necessarily mean that the components are separated from each other. That is, a plurality of components may be integrated into one hardware or software unit, or one component may be distributed to be configured in a plurality of hardware or software units. Therefore, even when not stated otherwise, such integrated or distributed exemplary embodiments are also included in the scope of the present disclosure.

In the present disclosure, components described in various exemplary embodiments do not necessarily mean essential components, and some may be optional components. Accordingly, an exemplary embodiment consisting of a subset of components described in an exemplary embodiment is also included in the scope of the present disclosure. In addition, exemplary embodiments including other components in addition to the components described in the various exemplary embodiments are included in the scope of the present disclosure.

Hereinafter, embodiments of the present disclosure will be described with reference to the accompanying drawings.

FIG. 1 is a block diagram illustrating the configuration of a cerebrovascular disease learning apparatus according to an embodiment of the present disclosure.

Referring to FIG. 1, the cerebrovascular disease learning apparatus 10 may include an MIP MRA configuration unit 11, a space characteristic learning unit 12, a frame characteristic learning unit 14 and a lesion characteristic learning unit 16.

The MIP MRA configuration unit 11 may receive 3D time-of-flight magnetic resonance angiography (3D TOF MRA) and configure maximum intensity projection magnetic resonance angiography (MIP MRA). Here, 3D TOF MRA may be 3D MRA obtained by strongly measuring a signal of an area, in which a blood vessel is present, in a brain area, and MIP MRA may be moving image data configured by time-series combination of image frames obtained by projecting 3D TOF MRA in various directions.

For example, the MIP MRA configuration unit 11 may check a predetermined projection position and obtain an image frame corresponding to the checked projection position. In addition, the MIP MRA configuration unit 11 may configure moving image data by time-series combining a plurality of image frames obtained through the above-described operation based on a predetermined time unit.

Figure 2:
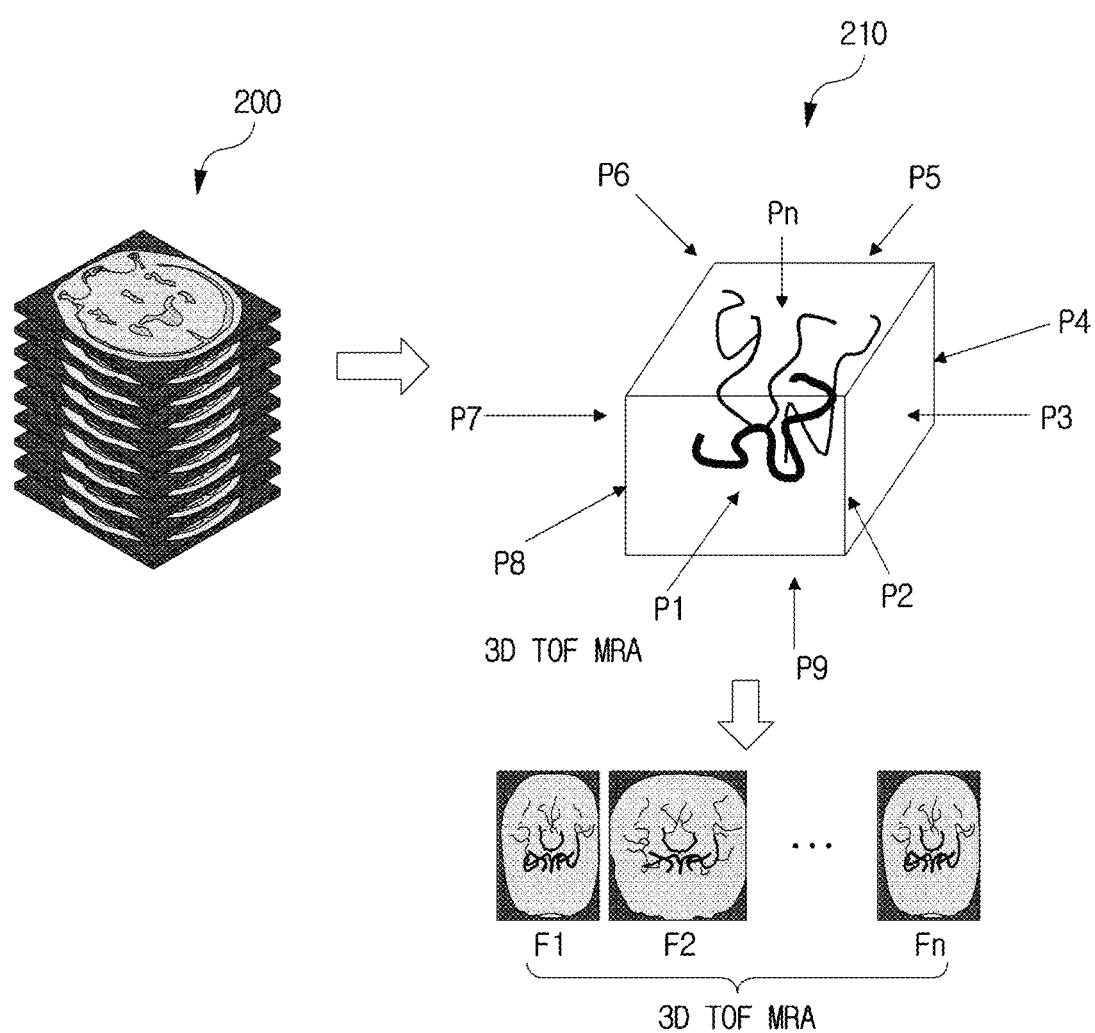
FIG. 2 is a view illustrating 3D TOF MRA and MIP MRA used for a cerebrovascular disease learning apparatus according to an embodiment of the present disclosure.

For example, referring to FIG. 2, at least one projection position may be set based on 3D TOF MRA 210 configured by stacking a plurality of 2D MRA images 200. The MIP MRA configuration unit 11 may obtain and configure a first image frame F1 at a first projection position P1 and obtain and configure a second image frame F2 at a second projection position. The MIP MRA configuration unit 11 may obtain n image frames Fn corresponding to n projection positions Pn by repeatedly performing such operation. In addition, the MIP MRA configuration unit 11 may configure moving image data type MIP MRA by aligning the n image frames Fn according to the predetermined position and arranging and combining the plurality of aligned image frames in predetermined time units (10 ms).

Furthermore, the MIP MRA may include projection positions P1, P2, . . . , Pn corresponding to image frames F1, F2, . . . , Fn and information on a time or arrangement order.

The space characteristic learning unit 12 may construct a space characteristic learning model 13 by learning the image frames F1, F2, . . . , Fn included in the MIP MRA, and, preferably construct the space characteristic learning model 13 based on a convolutional neural network (CNN) learning method.

When constructing the space characteristic learning model 13 of the space characteristic learning unit 12, the projection positions P1, P2, . . . , Pn corresponding to the image frames F1, F2, . . . , Fn and information on a time or arrangement order may be considered. For example, the space characteristic learning model 13 may include CNNs corresponding in number to the number of image frames F1, F2, . . . , Fn included in the MIP MRA, and the space characteristic learning unit 12 may be configured to transmit the first image frame F1 as input of a first CNN, to transmit the second image frame F2 as input of a second CNN, and to transmit an n-th image frame Fn as input of an n-th CNN.

In response thereto, a plurality of CNNs provided in the space characteristic learning model 13 may output a plurality of space characteristics respectively corresponding to the plurality of image frames F1, F2, . . . , Fn, and the space characteristic learning unit 12 may configure sequential data by sequentially arranging the plurality of space characteristics. At this time, the space characteristic learning unit 12 may configure sequential data in consideration of the projection positions P1, P2, . . . , Pn corresponding to the image frames F1, F2, . . . , Fn and information on a time or arrangement order.

Meanwhile, the frame characteristic learning unit 14 may receive a plurality of space characteristics composed of sequential data and perform learning to detect characteristics (that is, frame characteristics) for a relationship between the image frames. Preferably, the frame characteristic learning unit 14 may construct a frame characteristic learning model 15 based on a recurrent neural network (RNN) learning method.

The lesion characteristic learning unit 16 may learn lesion information corresponding to each of the plurality of image frames F1, F2, . . . , Fn. To this end, the frame characteristic learning unit 14 may configure parallel data by reconfiguring the frame characteristics composed of sequential data.

The lesion characteristic learning unit 16 may construct a lesion characteristic learning model 17 using the frame characteristics received from the frame characteristic learning unit 14.

The lesion characteristic learning model 17 may be a learning model based on a CNN learning method, and may include CNNs corresponding in number to the number of image frames F1, F2, . . . , Fn included in the MIP MRA. In addition, the lesion characteristic learning unit 16 may be configured to transmit a first frame characteristic corresponding to the first image frame F1 as input of a first CNN, to transmit a second frame characteristic corresponding to the second image frame F2 as input of a second CNN, and to transmit a n-th frame characteristic corresponding to the n-th image frame Fn as input of an n-th CNN.

Furthermore, the plurality of CNNs provided in the space characteristic learning model 13 may include a pooling structure for reducing the size of an information extraction domain, and the plurality of CNNs provided in the lesion characteristic learning model 17 may include an upsampling structure for increasing the size of a domain of a feature map.

The plurality of CNNs provided in the space characteristic learning model 13 and the lesion characteristic learning model 17 preferably includes two 3×3 convolutions. In addition, the space characteristic learning model 13 may include a 2×2 max-pooling operation structure, and the lesion characteristic learning model 17 may include a structure for doubling a length and width by bilinear interpolation.

Although, in the embodiment of the present disclosure, the size and number of convolutions provided in the space characteristic learning model 13 and the lesion characteristic learning model 17, the pooling structure provided in the space characteristic learning model 13 and the upsampling structure are shown, the present disclosure is not limited thereto and various modifications are possible.

Figure 3:
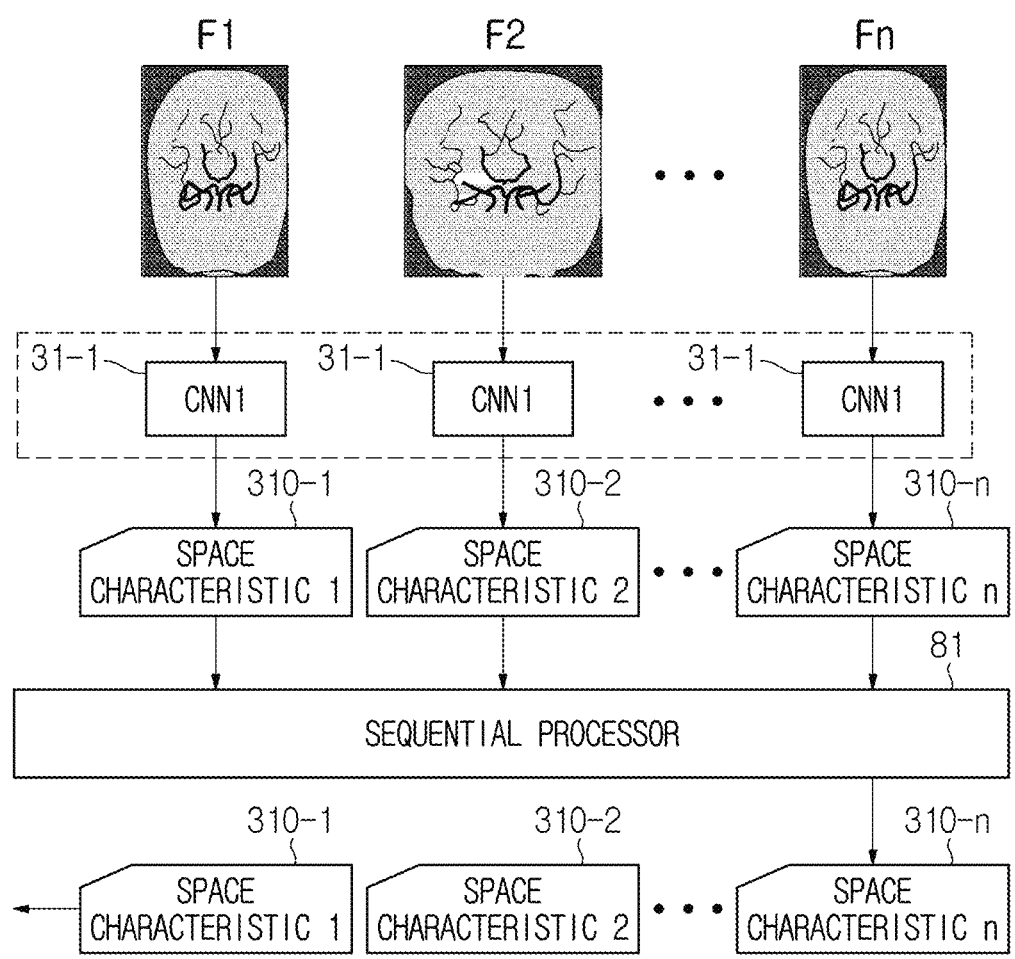
FIG. 3 is a view illustrating the detailed configuration of a space characteristic learning unit provided in a cerebrovascular disease learning apparatus according to an embodiment of the present disclosure.

FIG. 3 is a view illustrating the detailed configuration of a space characteristic learning unit provided in a cerebrovascular disease learning apparatus according to an embodiment of the present disclosure.

Referring to FIG. 3, a space characteristic learning unit 30 may include a space characteristic learning model 31 including a plurality of CNNs 31-1, 31-2 and 31-n, and the number of CNNs may correspond to the number of image frames F1, F2, . . . Fn included in the MIP MRA.

The space characteristic learning unit 30 may provide the image frames F1, F2, . . . Fn included in the MIP MRA as input of the plurality of CNNs 31-1, 31-2 and 31-n, respectively.

At this time, the space characteristic learning unit 30 may provide the image frames F1, F2, . . . Fn to the plurality of CNNs 31-1, 31-2 and 31-n in consideration of the projection positions P1, P2, . . . Pn corresponding to the image frames F1, F2, . . . Fn and information on a time or arrangement order. for example, the space characteristic learning unit 30 may be configured to transmit the first image frame F1 as input of the first CNN 31-1, to transmit the second image frame F2 as input of the second CNN 31-2 and to transmit the n-th image frame Fn as input of the n-th CNN 31-n.

In addition, the space characteristic learning unit 30 may include a sequential processor 33, and the sequential processor 33 may sequence a plurality of space characteristics 310-1, 310-2 and 310-n output through the plurality of CNNs 31-1, 31-2 and 31-n. The sequential processor 33 preferably sequences the plurality of space characteristics 310-1, 310-2 and 310-n in consideration of the projection positions P1, P2, . . . Pn and information on a time or arrangement order.

Hereinafter, the detailed configuration of the plurality of CNNs 31-1, 31-2 and 31-n will be described with reference to FIGS. 4 to 7.

Figure 4:
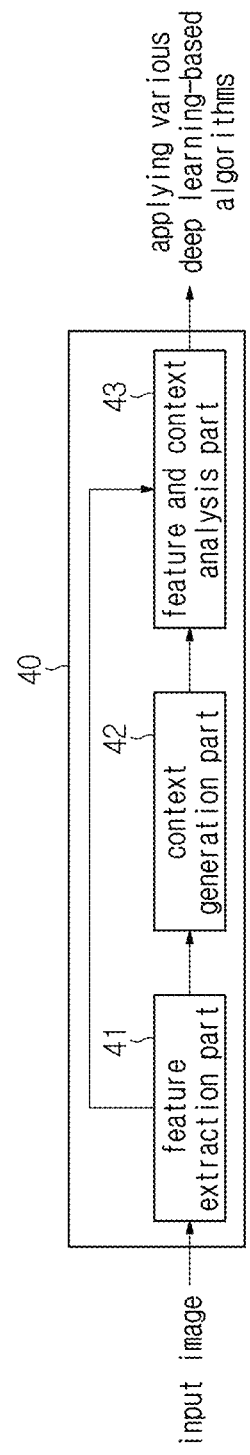
FIG. 4 is a block diagram illustrating the configuration of a space characteristic learning model provided in a cerebrovascular disease learning apparatus according to an embodiment of the present disclosure.

FIG. 4 is a block diagram illustrating the configuration of a space characteristic learning model provided in a cerebrovascular disease learning apparatus according to an embodiment of the present disclosure.

Referring to FIG. 4, a space characteristic learning model 40 may include a feature extractor 41, a context generator 42 and a feature and context analyzer 43. However, this shows only some components necessary to describe the present embodiment and the components included in the space characteristic learning model 40 are not limited to the above-described example.

The space characteristic learning model 40 extracts features of the analysis target image, generates context information on the basis of the extracted features, and analyzes the analysis target image on the basis of the extracted features and the generated context information. For example, the space characteristic learning model 40 may classify images or find a location of an object of interest by using the extracted features and generated context information.

The feature extraction part 41 may analyze an input image to extract a feature of the image. For example, the feature may be a local feature for each region of the image. The feature extraction part 41 according to the exemplary embodiment may extract features of the input image by using the general convolutional neural network (CNN) technique or the pooling technique. The pooling technique may include at least one of a max pooling technique and an average pooling technique. However, the pooling technique referred to in the present disclosure is not limited to the max pooling technique or the average pooling technique, but includes any technique for obtaining a representative value of an image region having a predetermined size. For example, the representative value used in the pooling technique may be at least one of a variance value, a standard deviation value, a mean value, a most frequent value, a minimum value, a weighted average value, and the like, in addition to a maximum value and an average value.

The convolutional neural network of the present disclosure may be used to extract "features" such as borders, line colors, and the like from input data (i.e., image), and may include a plurality of layers. Each layer may generate output data by receiving the input data and processing the input data of a corresponding layer. In the convolutional neural network, a feature map is generated by convolving an input image or an input feature map with a filter kernel and may be output as the output data. The initial layers of the convolutional neural network may be operated to extract low-level features such as edges or gradients from the input. The next layers of the neural network may gradually extract more complex features such as eyes, nose, etc.

The convolutional neural network may include a convolutional layer in which a convolution operation is performed, as well as a pooling layer in which a pooling operation is performed. The pooling technique is a technique used to reduce a spatial size of data in the pooling layer. Specifically, the pooling technique includes: a max pooling technique that selects a maximum value in a corresponding region; and an average pooling technique that selects an average value of the corresponding region, wherein the max pooling technique is generally used in the image recognition field. In the pooling technique, generally, a pooling window size and an interval (i.e., stride) are set to have the same value. Here, the stride relates to adjusting an interval for a filter to move when applying the filter to input data. The stride means the interval where the filter moves, and the stride may also be used to adjust a size of output data. A detailed operation of the pooling technique will be described later with reference to FIG. 6.

The feature extraction part 41 according to the exemplary embodiment of the present disclosure may apply filtering to an analysis target image as pre-processing for extracting a feature of the analysis target image. The filtering may be fast Fourier transform (FFT), histogram equalization, motion artifact removal or noise removal, etc. However, the filtering of the present disclosure is not limited to the above-described methods, and may include any type of filtering capable of improving image quality.

The context generation part 42 may generate context information of an input image (i.e., analysis target image) by using the features of the input image extracted from the feature extraction part 41. For example, the context information may be a representative value representing the entire or partial region of the analysis target image. In addition, the context information may be global context information of the input image. The context generation part 52 according to the exemplary embodiment may generate context information by applying the features extracted from the feature extraction part 41 using the convolutional neural network technique or the pooling technique. The pooling technique may be, for example, the average pooling technique.

The feature and context analysis part 43 may analyze an image on the basis of a feature extracted by the feature extraction part 41 and context information generated by the context generation part 42. The feature and context analysis part 43 according to the exemplary embodiment uses the local feature of each region of the image extracted by the feature extraction part 41 and the global context reconstructed in the context generation part 42 together in such a way as to concatenate the local feature and the global context, thereby being able to classify the input image or find the location of the object of interest included in the input image. Since the information at a specific two-dimensional position in the input image includes not only local feature information but also global context information, the feature and context analysis part 43 uses this information, so that more accurate recognition or classification becomes possible for input images that have different actual content but similar local feature information.

As described above, the invention according to the exemplary embodiment of the present disclosure enables more accurate and efficient learning and image analysis to be performed by using the global context information as well as the local features used by a general convolutional neural network technique. From this point of view, the invention according to the present disclosure may be referred to as a "deep neural network through context analysis".

Figure 5:
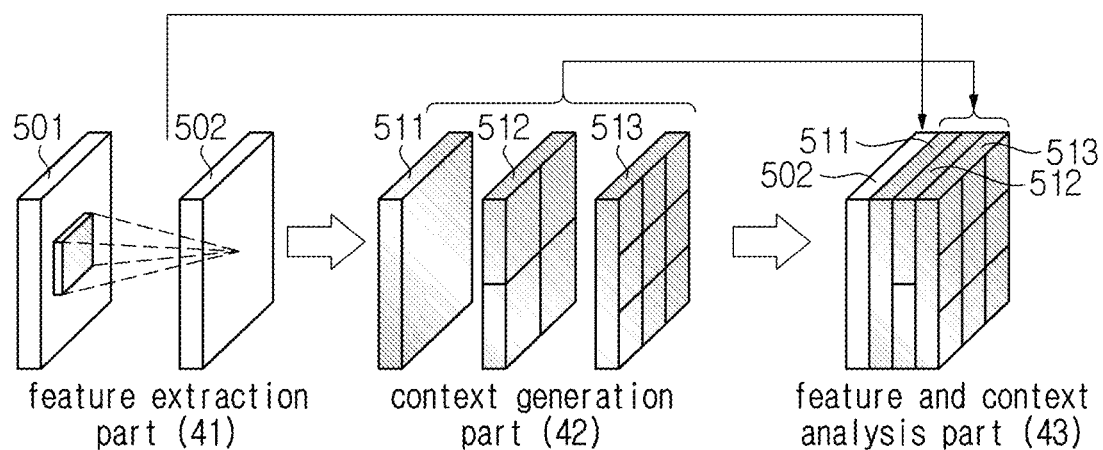
FIG. 5 is a view illustrating a process of generating and analyzing context information of an image according to an embodiment of the present disclosure.

FIG. 5 is a view showing a process of generating and analyzing context information of an image according to the exemplary embodiment of the present disclosure.

Referring to FIG. 5, the feature extraction part 41 uses an input image 501 to extract a feature from the input image 501, and may generate a feature image 502 including information of the extracted feature. The extracted feature may be the feature of a local region of the input image. The input image 501 may include an input image of an image analysis device or a feature map of each layer in the convolutional neural network model. In addition, the feature image 502 may include a feature map and/or a feature vector obtained by applying the convolutional neural network technique and/or pooling technique to the input image 501.

The context generation part 42 may generate context information by applying the convolutional neural network technique and/or pooling technique to the feature image 502 extracted by the feature extraction part 41. For example, by variously adjusting the pooling stride, the context generation part 42 may generate context information of images having various scales, such as an entire region, a quadrant region, and a nine equal part region. Referring to FIG. 5, the context generation part 42 may obtain images, including: an entire context information image 511 including context information for a full-sized image; a quadrant context information image 512 including context information for a quadrant image having a size obtained by dividing the entire image into quarters; and a nine equal part context information image 513 including context information for a nine equal part image having a size obtained by dividing the entire image into nine equal parts.

The feature and context analysis part 43 may more accurately analyze a specific region of the analysis target image by using both the feature image 502 and the context information images 511, 512, and 513.

The context generation part 42 according to the exemplary embodiment of the present disclosure generates context information 511, 512, and 513 on the basis of the analysis target image or the feature image 502, so as to more accurately identify and classify an object.

In the exemplary embodiment described with reference to FIG. 5, it has been described that context information for the entire image, context information for a quadrant image, and context information for a nine equal part image are generated and utilized, but the size of an image for extracting the context information is not limited thereto. For example, context information for an image having a size other than the above-described image may be generated and utilized.

Meanwhile, a convolutional neural network scheme and pooling according to an embodiment of the present disclosure will be described later with reference to FIGS. 6 and 7.

Figure 6:
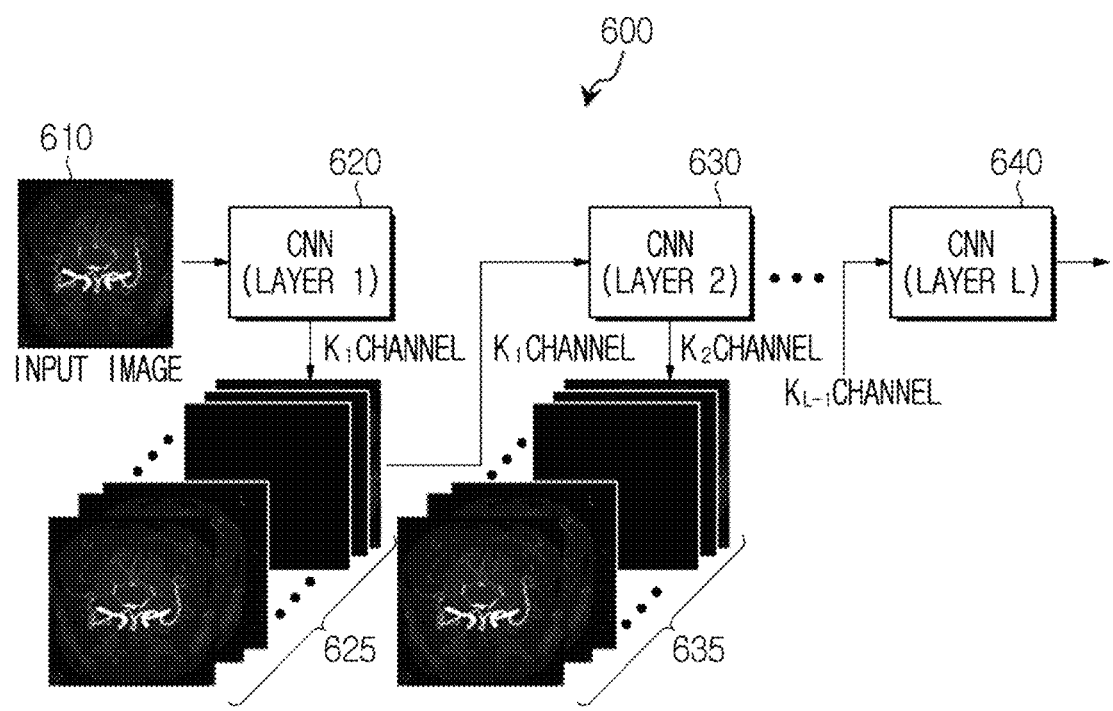
FIG. 6 is a view illustrating an embodiment of a convolutional neural network for generating a multiple-channel feature map.

FIG. 6 is a view illustrating an embodiment of a convolutional neural network for generating a multiple-channel feature map.

Image processing based on a convolutional neural network may be used in various fields, such as an image processing apparatus for object recognition of an image, an image processing apparatus for image reconstruction, an image processing apparatus for semantic segmentation, an image processing apparatus for scene recognition, etc.

An input image may be processed through a convolutional neural network 600, thereby outputting a feature map image. The output feature map image may be used in the above-described various fields.

A convolutional neural network 600 may be processed through a plurality of layers 620, 630 and 640 and each layer may output multiple-channel feature map images 625 and 635. The plurality of layers 620, 630 and 640 according to an embodiment may extract a feature of an image by applying a filter having a constant size from the top left to the bottom right of the input data. For example, the plurality of layers 620, 630 and 640 performs mapping to one neuron of the top left of a feature map by multiplying the top left N×M pixel of input data by a weight. In this case, the multiplied weight may also be N×M. The N×M may be, for example, 3×3, but is not limited thereto. Thereafter, in the same process, the plurality of layers 620, 630 and 640 may perform mapping to the neuron of the feature map by multiplying input data by a weight while scanning from the left to the right and from the top to the bottom by k columns. The K columns may mean a stride for moving the filter when performing convolution, and may be appropriately set to adjust the size of output data. For example, k may be 1. The N×M weight may be referred to as a filter or a filter kernel. That is, a process of applying the filter in the plurality of layers 620, 630 and 640 is a process of performing convolution operation with a filter kernel, and an extracted result is referred to as a "feature map" or "feature map image". In addition, a layer in which a convolution operation is performed may be referred to as a convolutional layer.

The term multiple-channel feature map may mean a set of feature maps corresponding to a plurality of channels and may be, for example, a plurality of image data. The multiple-channel feature maps may be input of an arbitrary layer of a convolutional neural network, and may be output according to a feature map operation result such as convolution operation. According to an embodiment, the multiple-channel feature maps 625 and 635 may be generated by the plurality of layers 620, 630 and 640 called "feature extraction layers" or "convolution layers" of the convolutional neural network. The respective layers may sequentially receive multiple-channel feature maps generated in the previous layer and generate subsequent multiple-channel feature maps as output. Finally, an L-th (L being an integer) layer 540 may receive multiple-channel feature maps generated in an (L−1)-th layer (not shown), thereby generating multiple-channel feature maps (not shown).

Referring to FIG. 6, feature maps 625 having $K_1$ channels are output according to a feature map operation 620 in Layer 1 for an input image 610 and are input for a feature map operation 530 in Layer 2. In addition, feature maps 635 having $K_2$ channels are output according to a feature map operation 530 in Layer 2 for input feature maps 625 and are input for a feature map operation (not shown) in Layer 3.

Referring to FIG. 6, multiple-channel feature maps 625 generated in a first layer 620 include feature maps corresponding to K1 (K1 being an integer) channels. In addition, multiple-channel maps 635 generated in a second layer 630 include feature maps corresponding to $K_2$ ($K_2$ being an integer) channels. Here, $K_1$ and $K_2$ indicating the number of channels may correspond to the number of filter kernels used in each of the first layer 620 and the second layer 630. That is, the number of multiple-channel feature maps generated in an M-th (m being an integer in a range from 1 to L−1, inclusive) layer may be equal to the number of filter kernels used in the M-th layer.

Figure 7:
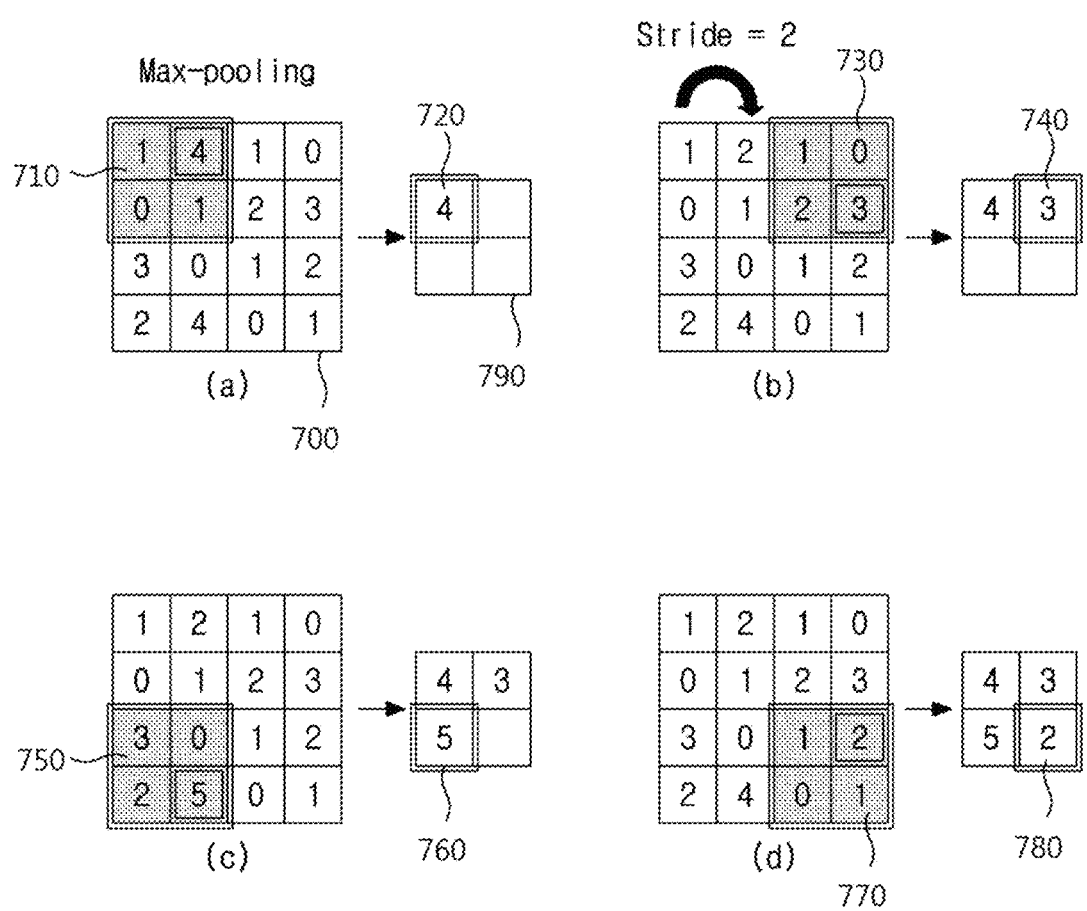
FIG. 7 is a view illustrating an embodiment of a pooling method.

FIG. 7 is a view illustrating an embodiment of a pooling method.

As shown in FIG. 7, a pooling window size is 2×2, a stride is 2, and an output image 790 may be generated by applying max-pooling to an input image 710.

In (a) of FIG. 7, a 2×2 window 710 is applied to the top left of an input image 710 and a representative example (here, a maximum value 4) among the values in the area of the window 710 is calculated and input to a corresponding position 720 of an output image 790.

Thereafter, in (b) of FIG. 7, the window is moved by the stride, that is, 2, and a maximum value 3 among the values in the area of a window 730 is input to a corresponding position 740 of the output image 790.

When the window cannot be moved to the right anymore, the above process is repeated from a position lower than the left of the input image by the stride. That is, as shown in (c) of FIG. 7, a maximum value 5 among the values in the area of a window 750 is input to a corresponding position 760 of the output image 790.

Thereafter, as shown in (d) of FIG. 7, the window is moved by the stride and a maximum value 2 among the values in the area of the window 770 is input to a corresponding position 780 of the output image 790.

The above process may be repeatedly performed until the window is located in the bottom right area of the input image 710, thereby generating the output image 790, to which pooling is applied to the input image 710.

A deep learning based model of the present disclosure may include at least one of a fully convolutional neural network, a convolutional neural network, a recurrent neural network, a restricted Boltzmann machine (RBM) or a deep belief neural network (DBN), but is not limited thereto. Alternatively, a machine learning method may be included in addition to deep learning. Alternatively, a hybrid model which is a combination of deep learning and machine learning may also be included. For example, a feature of an image may be extracted by applying a deep learning based model, and a machine learning based model may be applied when classifying or recognizing an image based on the extracted feature. The machine learning based model may include a support vector machine (SVM), AdaBoost, etc., but is not limited thereto.

Meanwhile, a CNN structure used in the space characteristic learning model is shown in FIGS. 4 to 7. A lesion learning model may also include the CNN structure described above with reference to FIGS. 4 to 7.

However, the space characteristic learning model may be configured to process compression of space characteristics through a pooling structure after extracting space characteristics. In response thereto, a lesion learning model may be configured to include a structure for detecting characteristics (e.g., lesion characteristics) of input image after performing upsampling through interpolation of input characteristics.

Figure 8:
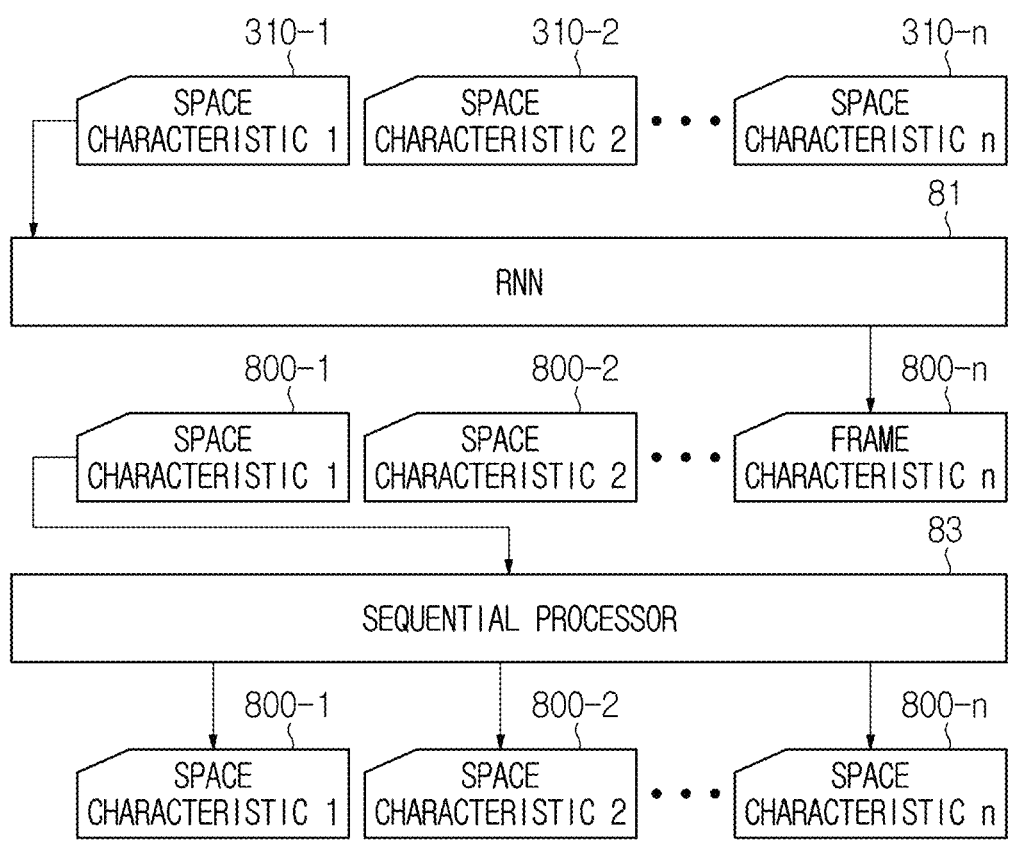
FIG. 8 is a view illustrating the detailed configuration of a frame characteristic learning unit provided in a cerebrovascular disease learning apparatus according to an embodiment of the present disclosure.

FIG. 8 is a view illustrating the detailed configuration of a frame characteristic learning unit provided in a cerebrovascular disease learning apparatus according to an embodiment of the present disclosure.

Referring to FIG. 8, a frame characteristic learning unit 80 may include a frame characteristic learning model 81 based on a recurrent neural network (RNN) method. The characteristic learning model 81 may sequentially receive space characteristic information corresponding to the image frames F1, F2, . . . Fn included in an MIP MRA and detect features between space characteristic information.

The RNN is a deep learning method which simultaneously considers current data and past data. The RNN refers to a neural network in which connection between units constructing an artificial neural network configures a directed cycle. Furthermore, various methods may be used in a structure capable of constructing the RNN. For example, representative examples include a fully recurrent network, a Hopfield network, an Elman Network, an Echo state network (ESN), a long short term memory network (LSTM), a bi-directional RNN, a continuous-time RNN (CTRNN), a hierarchical RNN and a secondary RNN. In addition, as a method for learning the RNN, a gradient descent method, Hessian Free Optimization or a Global Optimization Method may be used.

Meanwhile, the space characteristic information is extracted from the image frames F1, F2, . . . Fn included in the MIP MRA, and a frame characteristic learning unit 80 may check temporal information of the image frames F1, F2, . . . Fn included in the MIP MRA and perform frame characteristic learning of the space characteristic information based on the checked temporal information.

A frame characteristic learning model 81 learns frame characteristics of the space characteristic information of the image frames F1, F2, . . . Fn included in the MIP MRA and thus output frame characteristics 800-1, 800-2 and 800-$n$ corresponding to the image frames F1, F2, . . . Fn included in the MIP MRA.

Furthermore, the space characteristic information may be sequentially input to the frame characteristic learning model 81, and the frame characteristic learning model 81 may sequentially output the frame characteristics 800-1, 800-2 and 800-n.

Since a CNN based lesion characteristic learning unit may be configured to output lesion information of units of the image frames F1, F2, . . . Fn included in the MIP MRA, the frame characteristic learning unit 80 may further include a sequential processor 83 for transmitting the sequentially output frame characteristics 800-1, 800-2 and 800-n to a characteristic learning unit.

Figure 9:
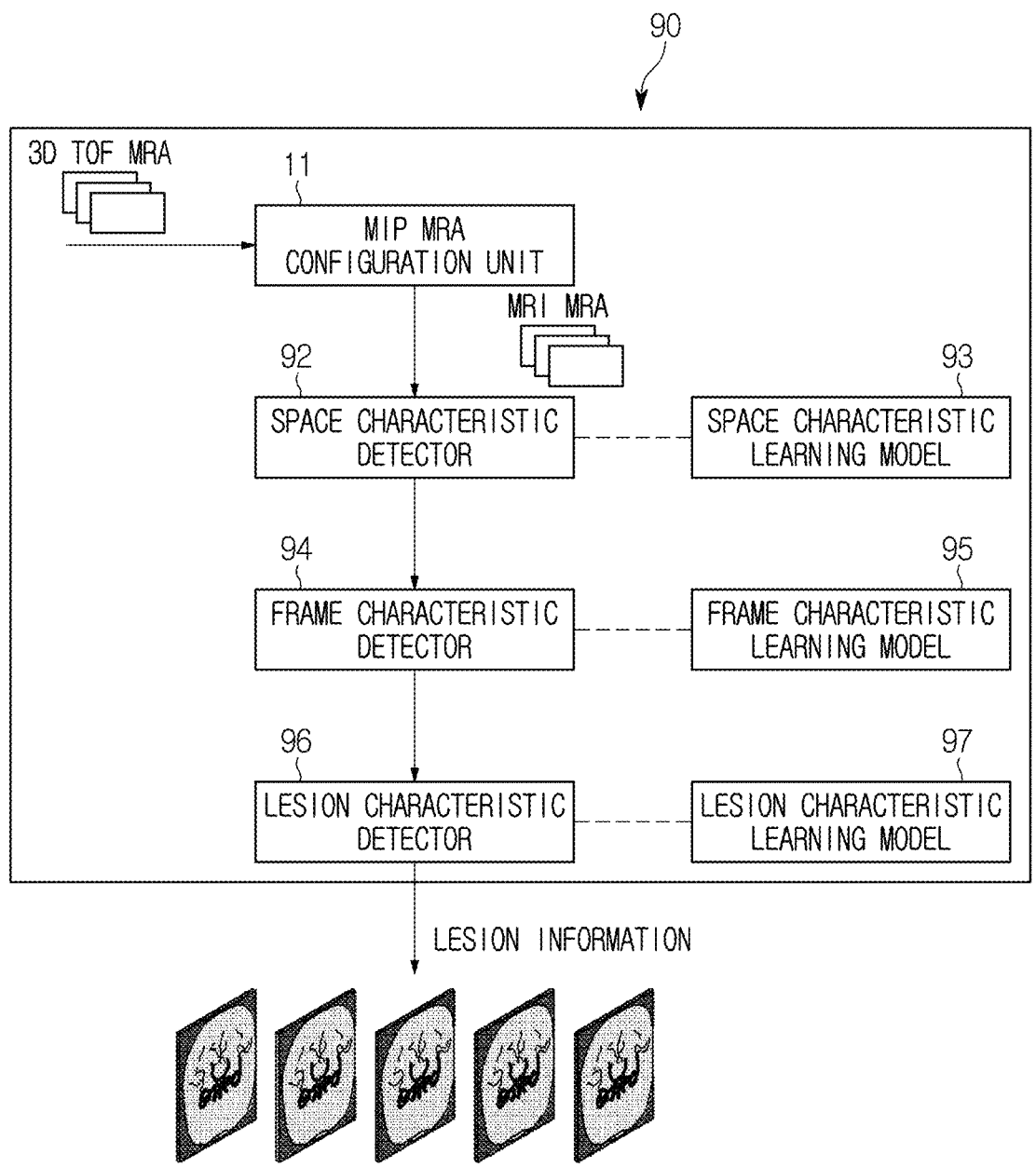
FIG. 9 is a block diagram illustrating the configuration of a cerebrovascular disease detection apparatus according to an embodiment of the present disclosure.

FIG. 9 is a block diagram illustrating the configuration of a cerebrovascular disease detection apparatus according to an embodiment of the present disclosure.

Referring to FIG. 9, the cerebrovascular disease detection apparatus 90 may include an MIP MRA configuration unit 91, a spatial characteristic detector 92, a frame characteristic detector 94 and a lesion characteristic detector 96.

The MIP MRA configuration unit 91 may receive 3D Time-of-flight magnetic resonance angiography (3D TOF MRA) and configure maximum intensity projection magnetic resonance angiography (MIP MRA). Here, 3D TOF MRA may be 3D MRA obtained by strongly measuring a signal of an area, in which a blood vessel is present, in a brain area. The MIP MRA may be moving image data configured by time-series combination of image frames obtained by projecting 3D TOF MRA in various directions.

For example, the MIP MRA configuration unit 91 may check a predetermined projection position and obtain an image frame corresponding to the checked projection position. In addition, the MIP MRA configuration unit 91 may configure moving image data by time-series combination of a plurality of image frames obtained through the above-described operation based on a predetermined time unit.

For example, referring to FIG. 2, at least one projection position may be set based on 3D TOF MRA 210 configured by stacking a plurality of 2D MRA images 200. The MIP MRA configuration unit 91 may obtain and configure a first image frame F1 at a first projection position P1 and obtain and configure a second image frame F2 at a second projection position. The MIP MRA configuration unit 91 may obtain n image frames Fn corresponding to n projection positions Pn by repeatedly performing such operation. The MIP MRA configuration unit 91 may configure moving image data type MIP MRA by aligning the n image frames Fn according to a predetermined position and arranging and combining the plurality of aligned images frames in predetermined time units (90 ms).

Furthermore, the MIP MRA may include projection positions P1, P2, . . . , Pn corresponding to the image frames F1, F2, . . . Fn and information on a time or arrangement order.

The space characteristic detector 92 may extract space characteristics from the image frames F1, F2, . . . Fn included in the MIP MRA. In particular, the space characteristic detector 92 may include a space characteristic learning model 93 corresponding to the space characteristic learning model 13 of FIG. 1, and extract space characteristics from the image frames F1, F2, . . . , Fn included in the MIP MRA through the space characteristic learning model 93.

For example, the space characteristic learning model 93 may include CNNs corresponding in number to the number of image frames F1, F2, . . . , Fn included in the MIP MRA, and the space characteristic detector 92 may transmit the first image frame F1 as input of a first CNN, transmit the second image frame F2 as input of a second CNN, and transmit an n-th image frame Fn as input of an n-th CNN.

In response thereto, a plurality of CNNs provided in the space characteristic learning model 93 may output a plurality of space characteristics respectively corresponding to the plurality of image frames F1, F2, . . . , Fn, and the space characteristic detector 92 may configure sequential data by sequentially arranging the plurality of space characteristics. At this time, the space characteristic detector 92 may configure sequential data in consideration of the projection positions P1, P2, . . . , Pn corresponding to the image frames F1, F2, . . . , Fn and information on a time or arrangement order.

Meanwhile, the frame characteristic detector 94 may receive a plurality of space characteristics composed of sequential data and detect characteristics (that is, frame characteristics) for a relationship between the image frames. Preferably, the frame characteristic detector 94 may detect frame characteristics using the frame characteristic learning model 95 based on a recurrent neural network (RNN) learning method. At this time, the frame characteristic learning model 95 may be the frame characteristic learning model 15 constructed through the frame characteristic learning unit 14 of FIG. 1.

Meanwhile, the lesion characteristic detector 96 may learn lesion information respectively corresponding to the plurality of image frames F1, F2, . . . , Fn. To this end, the frame characteristic detector 94 may configure parallel data by reconfiguring the frame characteristics composed of sequential data.

The lesion characteristic detector 96 may extract lesion characteristics from the frame characteristics received from the frame characteristic detector 94. In particular, the lesion characteristic detector 96 may include a lesion characteristic learning model 97 corresponding to the lesion characteristic learning model 17 constructed through the lesion characteristic learning unit 16 of FIG. 1.

The lesion characteristic learning model 97 may be a learning model based on a CNN learning method, and may include CNNs corresponding in number to the number of image frames F1, F2, . . . , Fn included in the MIP MRA. In addition, the lesion characteristic detector 96 may be configured to transmit a first frame characteristic corresponding to the first image frame F1 as input of a first CNN, to transmit a second frame characteristic corresponding to the second image frame F2 as input of a second CNN, and to transmit a n-th frame characteristic corresponding to the n-th image frame Fn as input of an n-th CNN.

Furthermore, the plurality of CNNs provided in the space characteristic learning model 93 may include a pooling structure for reducing the size of an information extraction domain, and the plurality of CNNs provided in the lesion characteristic learning model 97 may include an upsampling structure for increasing the size of a domain of a feature map.

The plurality of CNNs provided in the space characteristic learning model 93 and the lesion characteristic learning model 97 preferably includes two 3×3 convolutions. In addition, the space characteristic learning model 93 may include a 2×2 max-pooling operation structure, and the lesion characteristic learning model 97 may include a structure for doubling a length and width by bilinear interpolation.

Although, in the embodiment of the present disclosure, the size and number of convolutions provided in the space characteristic learning model 93 and the lesion characteristic learning model 97, the pooling structure provided in the space characteristic learning model 93 and the upsampling structure are shown, the present disclosure is not limited thereto and various modifications are possible.

Furthermore, for the detailed structures of the space characteristic learning model 93 and the lesion characteristic learning model 97, refer to the structures of the space characteristic learning model and the lesion characteristic learning model shown in FIGS. 4 to 7. In addition, for the detailed structure of the frame characteristic learning model 95, refer to the structure of the frame characteristic learning model shown in FIG. 8.

Figure 10:
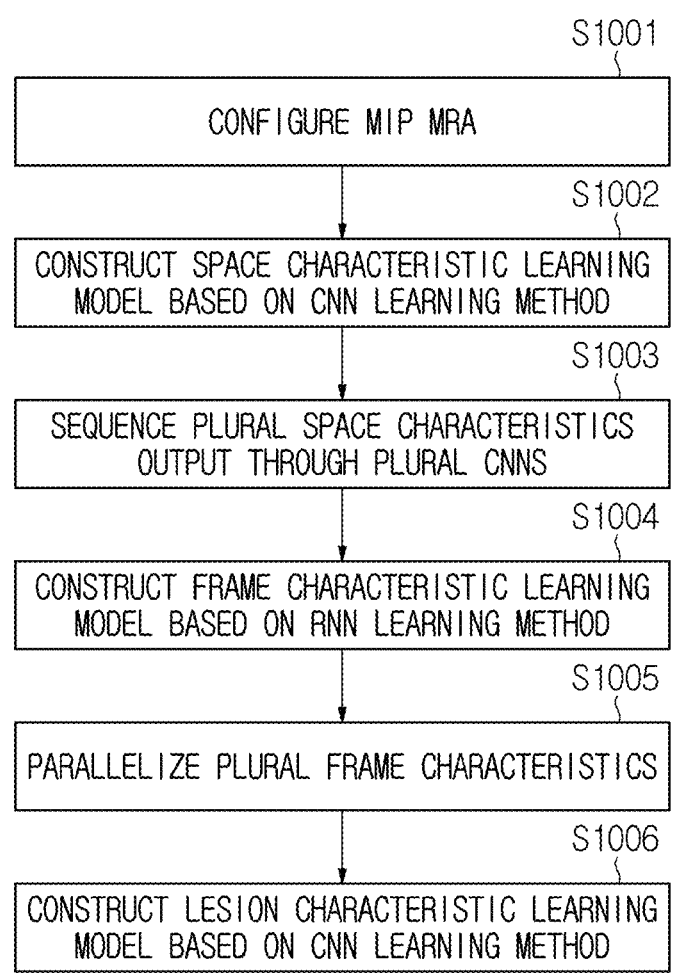
FIG. 10 is a flowchart illustrating a cerebrovascular disease learning method according to an embodiment of the present disclosure.

FIG. 10 is a flowchart illustrating a cerebrovascular disease learning method according to an embodiment of the present disclosure.

The cerebrovascular disease learning method according to the embodiment of the present disclosure may be performed by the cerebrovascular disease learning apparatus according to the embodiment of the present disclosure.

Referring to FIG. 10, first, the cerebrovascular disease learning apparatus may receive 3D Time-of-flight magnetic resonance angiography (3D TOF MRA) and configure maximum intensity projection magnetic resonance angiography (MIP MRA) (S1001). Here, 3D TOF MRA may be 3D MRA obtained by strongly measuring a signal of an area, in which a blood vessel is present, in a brain area, and MIP MRA may be moving image data configured by time-series combination of image frames obtained by projecting 3D TOF MRA in various directions.

For example, the cerebrovascular disease learning apparatus may check a predetermined projection position and obtain an image frame corresponding to the checked projection position. In addition, the cerebrovascular disease learning apparatus may configure moving image data by time-series combining a plurality of image frames obtained through the above-described operation based on a predetermined time unit.

For example, at least one projection position may be set based on 3D TOF MRA configured by stacking a plurality of 2D MRA images. The cerebrovascular disease learning apparatus may obtain and configure a first image frame F1 at a first projection position P1 and obtain and configure a second image frame F2 at a second projection position. The cerebrovascular disease learning apparatus may obtain n image frames Fn corresponding to n projection positions Pn by repeatedly performing such operation. In addition, the cerebrovascular disease learning apparatus may configure moving image data type MIP MRA by aligning the n image frames Fn according to the predetermined position and arranging and combining the plurality of aligned image frames in predetermined time units (10 ms).

Furthermore, the MIP MRA may include projection positions P1, P2, . . . , Pn corresponding to image frames F1, F2, . . . , Fn and information on a time or arrangement order.

The cerebrovascular disease learning apparatus may construct a space characteristic learning model by learning the image frames F1, F2, . . . , Fn included in the MIP MRA, and, preferably construct the space characteristic learning model based on a convolutional neural network (CNN) learning method (S1002).

When constructing the space characteristic learning model, the projection positions P1, P2, . . . , Pn corresponding to the image frames F1, F2, . . . Fn and information on a time or arrangement order may be considered. For example, the space characteristic learning model may include CNNs corresponding in number to the number of image frames F1, F2, . . . , Fn included in the MIP MRA, and the cerebrovascular disease learning apparatus may be configured to transmit the first image frame F1 as input of a first CNN, to transmit the second image frame F2 as input of a second CNN, and to transmit an n-th image frame Fn as input of an n-th CNN.

The cerebrovascular disease learning apparatus may provide the image frames F1, F2, . . . , Fn to the plurality of CNNs, in consideration of the projection positions P1, P2, . . . , Pn corresponding to the image frames F1, F2, . . . , Fn and a time or arrangement order. For example, the cerebrovascular disease learning apparatus may be configured to transmit the first image frame F1 as input of the first CNN, to transmit the second image frame F2 as input of the second CNN, and to transmit the n-th image frame Fn as input of the n-th CNN.

For the detailed structure and operation of the CNN provided in the space characteristic learning model, refer to the description of FIGS. 4 to 7.

Furthermore, the plurality of CNNs provided in the space characteristic learning model preferably includes two 3×3 convolutions. In addition, the space characteristic learning model may include a 2×2 max-pooling operation structure.

In addition, the cerebrovascular disease learning apparatus may sequence a plurality of space characteristics output through the plurality of CNNs (S1003). The cerebrovascular disease learning apparatus preferably sequences the plurality of space characteristics in consideration of the projection positions P1, P2, . . . , Pn and a time or arrangement order.

Meanwhile, the cerebrovascular disease learning apparatus may receive a plurality of space characteristics composed of sequential data and perform learning to detect characteristics (that is, frame characteristics) for a relationship between image frames (S1004). Preferably, the cerebrovascular disease learning apparatus may construct a frame characteristic learning model based on a recurrent neural network (RNN) learning method.

The RNN is a deep learning method which simultaneously considers current data and past data. The RNN refers to a neural network in which connection between units constructing an artificial neural network configures a directed cycle. Furthermore, various methods may be used in a structure capable of constructing the RNN. For example, representative examples include a fully recurrent network, a Hopfield network, an Elman Network, an Echo state network (ESN), a long short term memory network (LSTM), a bi-directional RNN, a continuous-time RNN (CTRNN), a hierarchical RNN and a secondary RNN. In addition, as a method for learning the RNN, a gradient descent method, Hessian Free Optimization or a Global Optimization Method may be used.

Meanwhile, the space characteristic information is extracted from the image frames F1, F2, . . . Fn included in the MIP MRA, and the cerebrovascular disease learning apparatus may check temporal information of the image frames F1, F2, . . . Fn included in the MIP MRA and perform frame characteristic learning of the space characteristic information based on the checked temporal information.

The cerebrovascular disease learning apparatus learns frame characteristics of the space characteristic information of the image frames F1, F2, . . . Fn included in the MIP MRA and thus output frame characteristics corresponding to the image frames F1, F2, . . . Fn included in the MIP MRA.

Furthermore, the space characteristic information may be sequentially provided to the frame characteristic learning model, and the frame characteristic learning model may sequentially output the frame characteristics.

Since a CNN based lesion characteristic learning unit may be configured to output lesion information of units of the image frames F1, F2, . . . Fn included in the MIP MRA, the cerebrovascular disease learning apparatus may further perform operation 51005 of performing parallelization to transmit the sequentially output frame characteristics to the lesion characteristic learning unit.

Next, in step S1006, the cerebrovascular disease learning apparatus may learn lesion information corresponding to each of the plurality of image frames F1, F2, . . . , Fn (S1006). For example, the cerebrovascular disease learning apparatus may construct a lesion characteristic learning model using the frame characteristics.

The lesion characteristic learning model may be a learning model based on a CNN learning method, and may include CNNs corresponding in number to the number of image frames F1, F2, . . . , Fn included in the MIP MRA. In addition, the cerebrovascular disease learning apparatus may be configured to transmit the first frame characteristic corresponding to the first image frame F1 as input of the first CNN, to transmit the second frame characteristic corresponding to the second image frame F2, and to transmit the n-th frame characteristic corresponding to the n-th image frame Fn as input of the n-th CNN.

Furthermore, the plurality of CNNs provided in the space characteristic learning model may include a pooling structure for reducing the size of an information extraction domain, and information transmitted to the lesion characteristic learning model through the space characteristic learning model and the frame characteristic learning model may be information compressed to a predetermined size based on the pooling structure. Based on this, the lesion characteristic learning model may include an upsampling structure for increasing the size of the domain through interpolation of input information.

Furthermore, the plurality of CNNs provided in the lesion characteristic learning model may include two 3×3 convolutions.

The cerebrovascular disease learning apparatus may receive 3D time-of-flight magnetic resonance angiography (3D TOF MRA) through the above-described method, and perform learning to output lesion information corresponding thereto.

Although, in the embodiment of the present disclosure, the size and number of convolutions provided in the space characteristic learning model and the lesion characteristic learning model, the pooling structure provided in the space characteristic learning model and the upsampling structure are shown, the present disclosure is not limited thereto and various modifications are possible.

Figure 11:
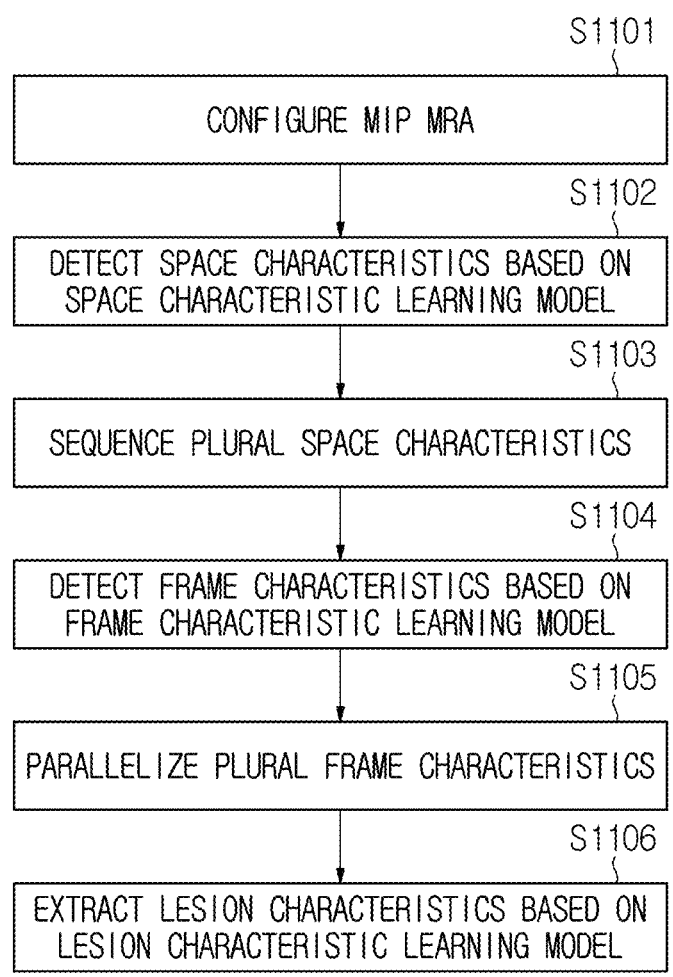
FIG. 11 is a flowchart illustrating a cerebrovascular disease detection method according to an embodiment of the present disclosure.

FIG. 11 is a flowchart illustrating a cerebrovascular disease detection method according to an embodiment of the present disclosure.

The cerebrovascular disease detection method according to the embodiment of the present disclosure may be performed by the cerebrovascular disease detection apparatus according to an embodiment of the present disclosure.

Referring to FIG. 11, first, the cerebrovascular disease detection apparatus may receive 3D Time-of-flight magnetic resonance angiography (3D TOF MRA) and configure maximum intensity projection magnetic resonance angiography (MIP MRA) (S1101). Here, 3D TOF MRA may be 3D MRA obtained by strongly measuring a signal of an area, in which a blood vessel is present, in a brain area, and MIP MRA may be moving image data configured by time-series combination of image frames obtained by projecting 3D TOF MRA in various directions.

For example, the cerebrovascular disease detection apparatus may check a predetermined projection position and obtain an image frame corresponding to the checked projection position. In addition, the cerebrovascular disease detection apparatus may configure moving image data by time-series combining a plurality of image frames obtained through the above-described operation based on a predetermined time unit.

For example, at least one projection position may be set based on 3D TOF MRA configured by stacking a plurality of 2D MRA images. The cerebrovascular disease detection apparatus may obtain and configure a first image frame F1 at a first projection position P1 and obtain and configure a second image frame F2 at a second projection position. The cerebrovascular disease detection apparatus may obtain n image frames Fn corresponding to n projection positions Pn by repeatedly performing such operation. In addition, the cerebrovascular disease detection apparatus may configure moving image data type MIP MRA by aligning the n image frames Fn according to the predetermined position and arranging and combining the plurality of aligned image frames in predetermined time units (10 ms).

Furthermore, the MIP MRA may include projection positions P1, P2, . . . , Pn corresponding to image frames F1, F2, . . . , Fn and information on a time or arrangement order.

Next, the cerebrovascular disease detection apparatus may extract space characteristics from each of the image frames F1, F2, . . . , Fn included in the MIP MRA (S1102). In particular, the cerebrovascular disease detection apparatus may include a space characteristic learning model constructed by the cerebrovascular disease learning method, and extract space characteristics from each of the image frames F1, F2, . . . , Fn included in the MIP MRA through the space characteristic learning model.

For example, the space characteristic learning model may include CNNs corresponding in number to the number of image frames F1, F2, . . . , Fn included in the MIP MRA, and the cerebrovascular disease detection apparatus may transmit the first image frame F1 as input of a first CNN, transmit the second image frame F2 as input of a second CNN, and transmit an n-th image frame Fn as input of an n-th CNN.

For the detailed structure and operation of the CNN provided in the space characteristic learning model, refer to the description of FIGS. 4 to 7.

Furthermore, the plurality of CNNs provided in the space characteristic learning model preferably includes two 3×3 convolutions. In addition, the space characteristic learning model may include a 2×2 max-pooling operation structure.

In addition, the cerebrovascular disease detection apparatus may sequence a plurality of space characteristics output through the plurality of CNNs 31-1, 31-2, . . . , 31-*n* (S1103). The cerebrovascular disease detection apparatus preferably sequences the plurality of space characteristics in consideration of the projection positions P1, P2, . . . , Pn and a time or arrangement order.

Meanwhile, the cerebrovascular disease detection apparatus may receive a plurality of space characteristics composed of sequential data and detect characteristics (that is, frame characteristics) for a relationship between image frames (S1104). Preferably, the cerebrovascular disease detection apparatus may detect frame characteristics using a frame characteristic learning model based on a recurrent neural network (RNN) learning method. At this time, the frame characteristic learning model may be constructed through the cerebrovascular disease learning method.

Furthermore, the space characteristic information may be sequentially provided to the frame characteristic learning model, and the frame characteristic learning model may sequentially output frame characteristics.

Meanwhile, since a CNN based lesion characteristic learning model may be configured to output lesion information of units of the image frames F1, F2, . . . Fn included in the MIP MRA, the cerebrovascular disease detection apparatus may further perform operation S1105 of performing parallelization to transmit the sequentially output frame characteristics to the lesion characteristic learning unit.

The cerebrovascular disease detection apparatus may extract lesion characteristics from the frame characteristics (S1106). In particular, the cerebrovascular disease detection apparatus may include a lesion characteristic learning model constructed through the cerebrovascular disease learning method.

The lesion characteristic learning model may be a learning model based on a CNN learning method, and may include CNNs corresponding in number to the number of image frames F1, F2, . . . , Fn included in the MIP MRA. In addition, the cerebrovascular disease detection apparatus may be configured to transmit the first frame characteristic corresponding to the first image frame F1 as input of the first CNN, to transmit the second frame characteristic corresponding to the second image frame F2, and to transmit the n-th frame characteristic corresponding to the n-th image frame Fn as input of the n-th CNN.

Furthermore, the plurality of CNNs provided in the space characteristic learning model may include a pooling structure for reducing the size of an information extraction domain, and information transmitted to the lesion characteristic learning model through the space characteristic learning model and the frame characteristic learning model may be information compressed to a predetermined size based on the pooling structure. Based on this, the lesion characteristic learning model may include an upsampling structure for increasing the size of the domain through interpolation of input information.

Furthermore, the plurality of CNNs provided in the lesion characteristic learning model may include two 3×3 convolutions.

The cerebrovascular disease detection apparatus may receive 3D time-of-flight magnetic resonance angiography (3D TOF MRA) through the above-described method, and perform operation of detecting and outputting lesion information corresponding thereto.

Although, in the embodiment of the present disclosure, the size and number of convolutions provided in the space characteristic learning model and the lesion characteristic learning model, the pooling structure provided in the space characteristic learning model and the upsampling structure are shown, the present disclosure is not limited thereto and various modifications are possible.

According to the present disclosure, it is possible to provide a method and apparatus capable of minimizing manipulations of a user (e.g., a doctor or an image reader) and rapidly and accurately detecting an area in which diagnosis or prognosis of a cerebrovascular disease is required or an area in which a cerebrovascular disease has occurred.

According to the present disclosure, it is possible to provide a method and apparatus for rapidly and accurately learning an area in which diagnosis of a cerebrovascular disease is required and an area in which a cerebrovascular disease has occurred.

According to the present disclosure, it is possible to provide a method and apparatus capable of accurately learning an area in which diagnosis of a cerebrovascular disease is required or an area in which a cerebrovascular disease has occurred, using MRA.

According to the present disclosure, it is possible to provide a method and apparatus capable of accurately detecting an area in which diagnosis of a cerebrovascular disease is required or an area in which a cerebrovascular disease has occurred, by only input of MRA.

It will be appreciated by persons skilled in the art that that the effects that can be achieved through the present disclosure are not limited to what has been particularly described herein and other advantages of the present disclosure will be more clearly understood from the detailed description.

Figure 12:
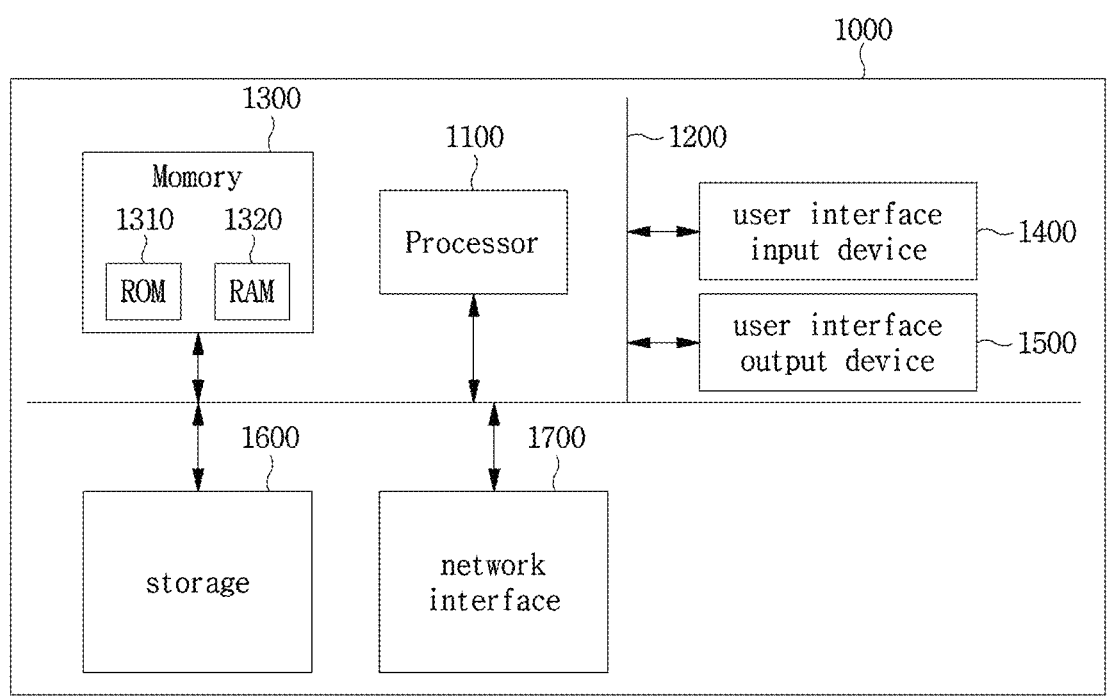
FIG. 12 is a block diagram illustrating a computing system for executing a cerebrovascular disease learning method and a cerebrovascular disease detection method according to an embodiment of the present disclosure.

FIG. 12 is a block diagram illustrating a computing system for executing a cerebrovascular disease learning method and a cerebrovascular disease detection method according to an embodiment of the present disclosure.

Referring to FIG. 12, a computing system 100 may include at least one processor 1100 connected through a bus 1200, a memory 1300, a user interface input device 1400, a user interface output device 1500, a storage 1600, and a network interface 1700.

The processor 1100 may be a central processing unit or a semiconductor device that processes commands stored in the memory 1300 and/or the storage 1600. The memory 1300 and the storage 1600 may include various volatile or non-volatile storing media. For example, the memory 1300 may include a ROM (Read Only Memory) and a RAM (Random Access Memory).

Accordingly, the steps of the method or algorithm described in relation to the embodiments of the present disclosure may be directly implemented by a hardware module and a software module, which are operated by the processor 1100, or a combination of the modules. The software module may reside in a storing medium (that is, the memory 1300 and/or the storage 1600) such as a RAM memory, a flash memory, a ROM memory, an EPROM memory, an EEPROM memory, a register, a hard disk, a detachable disk, and a CD-ROM. The exemplary storing media are coupled to the processor 1100 and the processor 1100 can read out information from the storing media and write information on the storing media. Alternatively, the storing media may be integrated with the processor 1100. The processor and storing media may reside in an application specific integrated circuit (ASIC). The ASIC may reside in a user terminal. Alternatively, the processor and storing media may reside as individual components in a user terminal.

The exemplary methods described herein were expressed by a series of operations for clear description, but it does not limit the order of performing the steps, and if necessary, the steps may be performed simultaneously or in different orders. In order to achieve the method of the present disclosure, other steps may be added to the exemplary steps, or the other steps except for some steps may be included, or additional other steps except for some steps may be included.

Various embodiments described herein are provided to not arrange all available combinations, but explain a representative aspect of the present disclosure and the configurations about the embodiments may be applied individually or in combinations of at least two of them.

Further, various embodiments of the present disclosure may be implemented by hardware, firmware, software, or combinations thereof. When hardware is used, the hardware may be implemented by at least one of ASICs (Application Specific Integrated Circuits), DSPs (Digital Signal Processors), DSPDs (Digital Signal Processing Devices), PLDs (Programmable Logic Devices), FPGAs (Field Programmable Gate Arrays), a general processor, a controller, a micro controller, and a micro-processor.

The scope of the present disclosure includes software and device-executable commands (for example, an operating system, applications, firmware, programs) that make the method of the various embodiments of the present disclosure executable on a machine or a computer, and non-transitory computer-readable media that keeps the software or commands and can be executed on a device or a computer.

What is claimed is:

1. An electronic apparatus for constructing a learning model based on an image, the electronic apparatus comprising:
   a maximum intensity projection magnetic resonance angiography (MIP MRA) configuration unit configured to receive 3D time-of-flight magnetic resonance angiography (3D TOF MRA) and to construct MIP MRA including a plurality of image frames;
   a space characteristic learning unit configured to construct a space characteristic learning model based on a convolutional neural network (CNN) learning method, the space characteristic learning model learning space characteristics of each of the plurality of image frames;
   a frame characteristic learning unit configured to receive the space characteristics and to construct a frame characteristic learning model based on a recurrent neural network (RNN) learning method, the frame characteristic learning model learning frame characteristics representing characteristics between the plurality of image frames; and
   a lesion characteristic learning unit configured to receive the frame characteristics and to construct a lesion characteristic learning model based on the CNN learning method, the lesion characteristic learning model learning lesion characteristics of each of the plurality of image frames,
   wherein the space characteristic learning model comprises a sequential processor configured to sequence a plurality of space characteristics of each of the plurality of image frames.

2. The electronic apparatus of claim 1, wherein the space characteristic learning model comprises a plurality of CNNs configured to receive each of the plurality of image frames and to learn space characteristics of the received image frames.

3. The electronic apparatus of claim 1, wherein the frame characteristic learning unit comprises a parallelization processor configured to parallelize the frame characteristics output through the frame characteristic learning model in consideration of the plurality of image frames.

4. The electronic apparatus of claim 1, wherein the space characteristic learning model comprises a max-pooling operation structure having a predetermined size.

5. The electronic apparatus of claim 4, wherein the lesion characteristic learning model comprises an upsampling structure for increasing a size of a feature map of the frame characteristics in consideration of the predetermined size.

6. An electronic apparatus for detecting a lesion based on an image, the electronic apparatus comprising:
   a maximum intensity projection magnetic resonance angiography (MIP MRA) configuration unit configured to receive 3D time-of-flight magnetic resonance angiography (3D TOF MRA) and to construct MIP MRA including a plurality of image frames;
   a space characteristic detector including a space characteristic learning model constructed through learning of space characteristics of each of the plurality of image frames based on a convolutional neural network (CNN) learning method and configured to detect the space characteristics of each of the plurality of image frames through the space characteristic learning model;
   a frame characteristic detector including a frame characteristic learning model constructed through learning of frame characteristics corresponding to the space characteristics based on a recurrent neural network (RNN) learning method and configured to detect the frame characteristics through the frame characteristic learning model; and
   a lesion characteristic detector including a lesion characteristic learning model constructed through learning of lesion characteristics corresponding to the frame characteristics based on the CNN learning method and configured to detect lesion characteristics of each of the plurality of image frames through the lesion characteristic learning model,
   wherein the space characteristic detector comprises a sequential processor configured to sequence a plurality of space characteristics of each of the plurality of image frames.

7. The electronic apparatus of claim 6, wherein the frame characteristic detector comprises a parallelization processor configured to parallelize frame characteristics output through the frame characteristic learning model in consideration of the plurality of image frames.

8. The electronic apparatus of claim 6, wherein the space characteristic learning model comprises a max-pooling operation structure having a predetermined size, and wherein the lesion characteristic learning model comprises an upsampling structure for increasing a size of a feature map of the frame characteristics in consideration of the predetermined size.

9. A method of, by an electronic apparatus, constructing a learning model based on an image, the method comprising:
   receiving 3D time-of-flight magnetic resonance angiography (3D TOF MRA) and constructing maximum intensity projection magnetic resonance angiography (MIP MRA) including a plurality of image frames;
   constructing a space characteristic learning model based on a convolutional neural network (CNN) learning method, the space characteristic learning model learning space characteristics of each of the plurality of image frames;
   receiving the space characteristics and constructing a frame characteristic learning model based on a recurrent neural network (RNN) learning method, the frame characteristic learning model learning frame characteristics representing characteristics between the plurality of image frames; and
   receiving the frame characteristics and constructing a lesion characteristic learning model based on the CNN learning method, the lesion characteristic learning model learning lesion characteristics of each of the plurality of image frames,
   wherein constructing the space characteristic learning model further comprising constructing a sequential processor configured to sequence a plurality of space characteristics of each of the plurality of image frames.

* * * * *